(12) United States Patent
Uemura

(10) Patent No.: US 6,784,913 B2
(45) Date of Patent: Aug. 31, 2004

(54) EXPOSURE RECORDING APPARATUS FOR RECORDING A TWO-DIMENSIONAL IMAGE

(75) Inventor: Takayuki Uemura, Odawara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 27 days.

(21) Appl. No.: 10/073,414

(22) Filed: Feb. 13, 2002

(65) Prior Publication Data

US 2002/0122214 A1 Sep. 5, 2002

(30) Foreign Application Priority Data

Mar. 2, 2001 (JP) ........................................ 2001-058755

(51) Int. Cl.$^7$ .............................. B41J 2/435; B41J 2/47
(52) U.S. Cl. ...................................... 347/247; 347/237
(58) Field of Search ................................ 347/237, 234, 347/235, 239, 247, 248, 249, 250, 255; 355/53, 54

(56) References Cited

U.S. PATENT DOCUMENTS 4,541,712 A * 9/1985 Whitney ........................ 355/53

FOREIGN PATENT DOCUMENTS

| JP | 2783328 | | 5/1998 | |
| JP | 11-1020 | * | 1/1999 | .............. B41J/2/44 |

* cited by examiner

Primary Examiner—Hai Pham
(74) Attorney, Agent, or Firm—Sughrue Mion, PLLC

(57) ABSTRACT

An AOD is switched between a state capable of outputting 0th-order light and a state capable of outputting 1st-order light according to a switching signal, and a second delay signal which is produced by delaying the switching signal a given time is generated by a first delay unit and a second delay unit. 0th-order or 1st-order image data is supplied to a laser diode according to the second delay signal to record an image highly accurately on a recording film at a time selected in view of a response delay of the AOD.

16 Claims, 4 Drawing Sheets

EXPOSURE RECORDING APPARATUS FOR RECORDING A TWO-DIMENSIONAL IMAGE

BACKGROUND OF THE INVENTION

1. Field of the Invention

The present invention relates to an exposure recording apparatus for recording a two-dimensional image on an image recording material by applying a light beam emitted from a light source to the image recording material to scan the image recording material relatively in a main scanning direction and in an auxiliary scanning direction.

2. Description of the Related Art

Exposure recording apparatus are used for recording a two-dimensional image on an image recording material by rotating a drum with the image recording material mounted on its outer circumferential surface in a main scanning direction and applying a laser beam modulated by image information to the image recording material to scan the image recording material in an auxiliary scanning direction which is perpendicular to the main scanning direction.

Some exposure recording apparatus of the type described above employ an acousto-optic deflector (AOD) for deflecting the laser beam by small distances in the auxiliary scanning direction to generate a plurality of main scanning lines substantially at the same time for the purpose of recording a two-dimensional image at a high speed. Specifically, ultrasonic vibrations are applied to the AOD to diffract the laser beam to produce 0th-order light and 1st-order light, and the laser beam is modulated by image information to produce two scanning lines substantially at the same time.

The AOD undergoes a time delay after ultrasonic vibrations are applied until a diffraction grating is generated. If ultrasonic vibrations are applied to the AOD and the laser beam is modulated at the same time, then pixels represented by the 1st-order light are formed in a position where pixels are to be recorded by the 0th-order light, resulting in a disturbed recorded image.

SUMMARY OF THE INVENTION

It is a general object of the present invention to provide an exposure recording apparatus which is capable of recording a highly accurate image at a high speed by exposure to a light beam that is deflected by small distances in a direction different from a main scanning direction.

A principal object of the present invention is to provide an exposure recording apparatus which is capable of recording a highly accurate image by highly accurately generating a delay signal depending on the delay characteristics of a light beam deflecting means.

Another object of the present invention is to provide an exposure recording apparatus which is capable of recording a highly accurate image by highly accurately generating a delay signal depending on the delay characteristics of a light beam deflecting means that differ depending on the direction in which the light beam is deflected.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
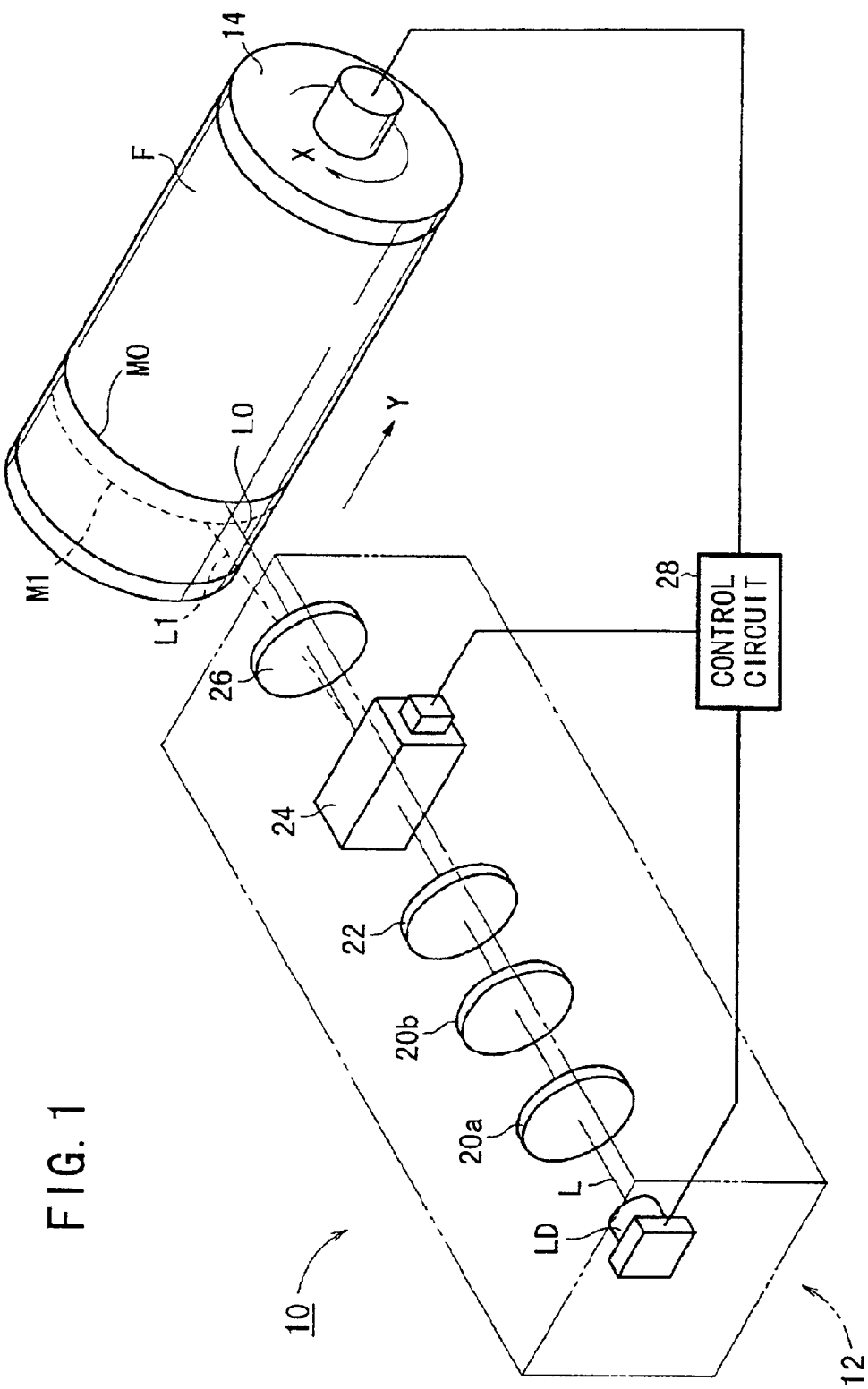
FIG. 1 is a schematic perspective view of a laser beam recording apparatus which incorporates an exposure recording apparatus according to the present invention.

FIG. 1 shows a laser beam recording apparatus 10 which incorporates an exposure recording apparatus according to the present invention. As shown in FIG. 1, the laser beam recording apparatus 10 serves to record an area-modulated image on a recording film F (image recording material) by applying two laser beams L0, L1 emitted from an exposure head 12 simultaneously to the recording film F which is mounted on a cylindrical drum 14. Specifically, the recording film F records a two-dimensional image thereon by moving the exposure head 12 in an auxiliary scanning direction indicated by the arrow Y with respect to the drum 14 which is rotating in a main scanning direction indicated by the arrow X. The area-modulated image is an image generated by selectively turning on and off the laser beams L0, L1 depending on image information thereby to form a plurality of pixels on the recording film F. The area occupied by the formed pixels provides a certain gradation.

The exposure head 12 comprises a laser diode LD for emitting a laser beam L modulated by the image information, a pair of collimator lenses 20a, 20b for collimating the laser beam L, a beam expander lens 22 for adjusting the diameter of the collimated laser beam L, an AOD 24 (light beam deflecting means) for deflecting the laser beam L a small distance in the auxiliary scanning direction indicated by the arrow Y to produce a laser beam L0 which is 0th-order light or a laser beam L1 which is 1st-order light, and a focusing lens 26 for converging the laser beams L0, L1 onto the recording film F on the drum 14.

Figure 2:
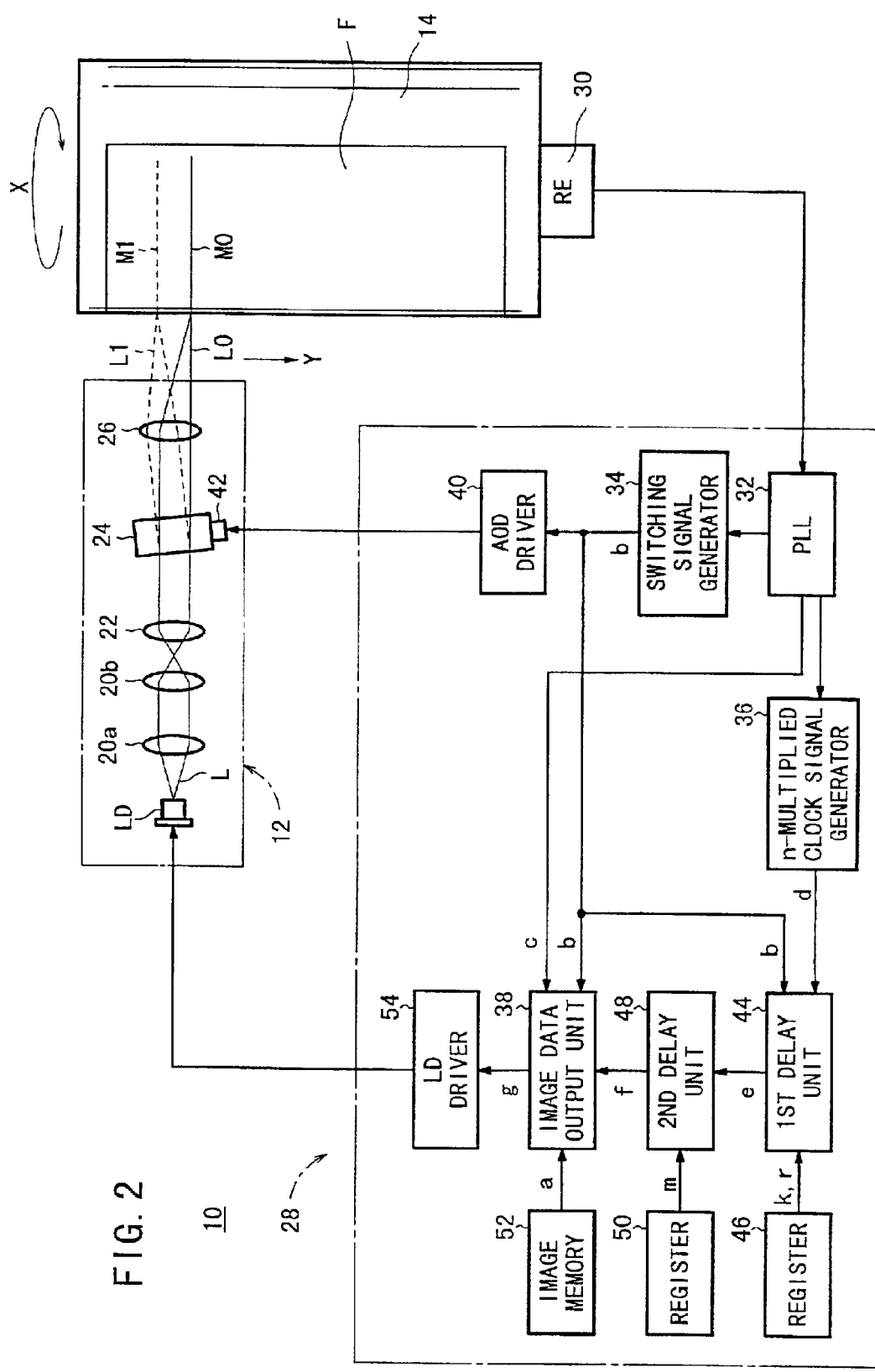
FIG. 2 is a block diagram of a control circuit of the laser beam recording apparatus shown in FIG. 1.

FIG. 2 shows in block form a control circuit 28 of the laser beam recording apparatus 10. A circuit for controlling the movement of the exposure head 12 in the auxiliary scanning direction and a circuit for controlling the rotation of the drum 14 will not be described below as they have no direct bearing on the present invention.

The control circuit 28 has a phase-locked loop (PLL) 32 for generating a pixel clock signal c to adjust the timing of recording a pixel in the main scanning direction from an angular position signal generated by a rotary encoder 30 which detects the angular position of the drum 14. The pixel clock signal c generated by the PLL 32 is supplied to a switching signal generator 34, an n-multiplied clock signal generator 36, and an image data output unit 38 of the control circuit 28.

The switching signal generator 34 generates a switching signal b for switching between the laser beam L0 and the laser beam L1 from the pixel clock signal c. The switching signal b is supplied to an AOD driver 40. The AOD driver 40 outputs a drive signal for energizing a transducer 42 of the AOD 24.

The n-multiplied clock signal generator 36 outputs an n-multiplied clock signal d which is generated by multiplying the pixel clock signal c by n (n is an integer of 2 or greater), to a first delay unit 44. The first delay unit 44 generates a first delay signal e by counting pulses of the n-multiplied clock signal d according to a delayed pulse number setting value k (coarse adjustment data) and a duty setting value r which are set in a register 46, and outputs the first delay signal e to a second delay unit 48. The second delay unit 48 generates a second delay signal f by delaying the first delay signal e by a small delay time which is selected by a small delay time selecting value m (fine adjustment data) which is set in a register 50, and outputs the generated second delay signal f to the image data output unit 38. The first delay unit 44 and the second delay unit 48 jointly make up a delay signal generating means.

The image data output unit 38 reads and latches image data a stored in an image memory 52 according to the pixel clock signal c from the PLL 32, thereafter delays the image data a as 0th-order data or 1st-order data selected by the switching signal b from the switching signal generator 34 by a given time according to the second delay signal f from the second delay unit 48, and supplies the delayed image data a as image data g to an LD driver 54 (light beam modulating means). The LD driver 54 outputs a drive signal for driving the laser diode LD according to the image data g.

Figure 3:
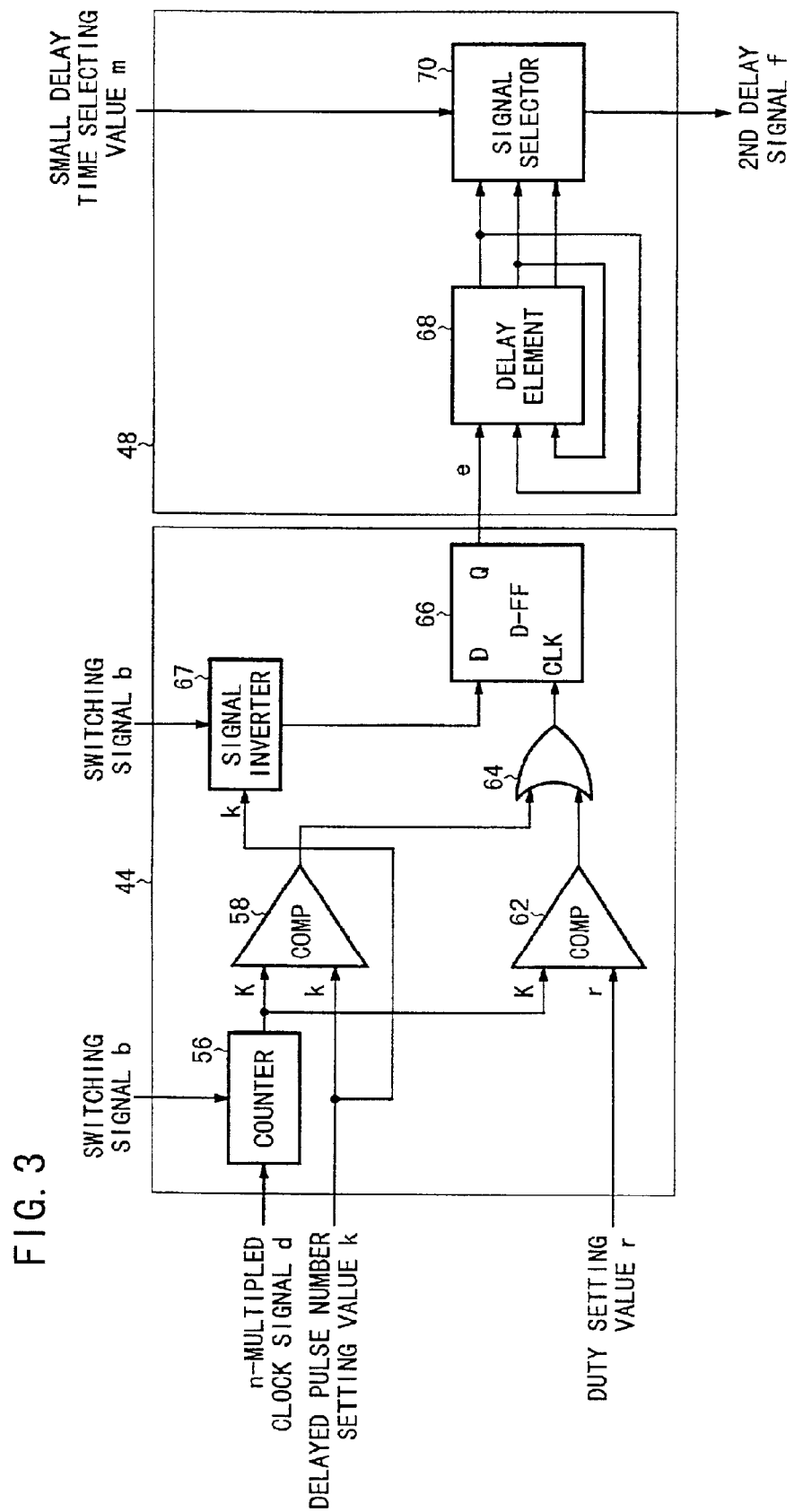
FIG. 3 is a block diagram of a first delay unit and a second delay unit in the control circuit shown in FIG. 2.

FIG. 3 shows in detailed block form the first delay unit 44 and the second delay unit 48.

The first delay unit 44 generates the first delay signal e by coarsely adjusting the delay time of the switching signal b. The first delay unit 44 comprises a counter 56 (measuring unit) for counting pulses of the n-multiplied clock signal d from the n-multiplied clock signal generator 36 after having been reset by the switching signal b, a comparator (COMP) 58 (first comparator) for comparing a count K of the n-multiplied clock signal d from the counter 56 and the delayed pulse number setting value k from the register 46 with each other, and outputting a high-level signal when the count K and the delayed pulse number setting value k agree with each other, a comparator (COMP) 62 (second comparator) for comparing the count K from the counter 56 and the duty setting value r from the register 46 with each other, and outputting a high-level signal when the count K and the duty setting value r agree with each other, a signal inverter 67 (delay signal switching unit) for comparing a multiplication number n and delayed pulse number setting value k with each other and inverting the switching signal b when k≧n, and a D flip-flop (D-FF) 66 (delay signal output unit) for outputting the switching signal b supplied to a D terminal via the signal inverter 67 as the first delay signal e according to an output signal from an OR gate 64 which represents output signals of the comparators 58, 62. The counter 56 is of an arrangement capable of counting $2n$ pulses or more.

The second delay unit 48 comprises a delay element 68 for delaying the first delay signal e outputted from a Q terminal of the D-FF 66 by a small delay time, and a signal selector 70 for selecting a small delay time according to the small delay time selecting value m. The delay element 68 has a plurality of output terminals of different delay times, and may comprise a circuit component such as an FPGA (Field Programmable Gate Array), a TTL (Transistor-Transistor Logic), or the like. The signal selector 70 outputs the second delay signal f which is delayed by a desired delay time by selecting one of the output terminals of the delay element 68 according to the small delay time selecting value m.

The laser beam recording apparatus 10 is basically constructed as described above. Operation of the laser beam recording apparatus 10 will be described below.

When the drum 14 with the recording film F mounted thereon is rotated about its own axis, the angular position of the drum is detected by the rotary encoder 30, which supplies an angular position signal representing the detected angular position to the PLL 32. The PLL 32 generates a pixel clock signal c from the supplied angular position signal, and supplies the generated pixel clock signal c to the switching signal generator 34 and the image data output unit 38.

The switching signal generator 34 generates a switching signal b which is turned on/off in timed relation to positive-going edges of the pixel clock signal c supplied to the switching signal generator 34, for example, and outputs the generated switching signal b to the AOD driver 40 and the image output unit 38. The AOD driver 40 supplies the switching signal b to the transducer 42, which energizes the AOD 24. The AOD 24 is controlled to apply the laser beam L0 which is 0th-order light to the recording film F when the switching signal b is turned off, i.e., low in level, and to apply the laser beam L1 which is 1st-order light to the recording film F when the switching signal b is turned on, i.e., high in level.

The image data output unit 38 reads image data relative to pixels making up two main scanning lines M0, M1 to be recorded on the recording film F from the image memory 52 according to the pixel clock signal c supplied to the image data output unit 38. Then, the image data output unit 38 selects 0th-order data which is image data to be recorded on the main scanning line M0 or 1st-orther data which is image data to be recorded on the main scanning line M1 according to the switching signal b. The image data output unit 38 then outputs the selected image data to the LD driver 54 according to the second delay signal f supplied from the second delay unit 48.

The LD driver 54 supplies a drive signal to the laser diode LD, which outputs a laser beam L that is turned on and off according to the image data. The outputted laser beam L is converted into a parallel beam by the collimator lenses 20a, 20b, adjusted in beam diameter by the beam expander lens 22, and then supplied to the AOD 24.

The AOD 24 is energized by the transducer 42. While the 0th-order light is selected by the switching signal b and the AOD 24 is set to a deflecting state capable of outputting the 0th-order light, the AOD 24 applies the laser beam L0 via the focusing lens 26 to the recording film F, forming pixels of the main scanning line M0 on the recording film F. While the 1st-order light is selected by the switching signal b and the AOD 24 is set to a deflecting state capable of outputting the 1st-order light, the AOD 24 applies the laser beam L1 via the focusing lens 26 to the recording film F, forming pixels of the main scanning line M1 on the recording film F. While pixels of the main scanning line M0 and pixels of the main scanning line M1 are alternately formed on the recording film F, since the drum 14 is rotated in the main scanning direction indicated by the arrow X, the laser beams L0, L1 are simultaneously moved in the main scanning direction and the auxiliary scanning direction with respect to the recording film F, and deflected obliquely on the recording film F, forming those pixels on the recording film F. Since the exposure head 12 for alternately forming the main scanning lines M0, M1 are moving in the auxiliary scanning direction indicated by the arrow Y, a two-dimensional image is formed on the recording film F by the laser beams L0, L1.

The AOD 24 undergoes a certain response delay after the drive signal based on the switching signal b is supplied via the AOD driver 40 to the transducer 42 until the AOD 24 is brought to a state capable of applying the laser beam L0 or L1 to the main scanning lines M0, M1. According to the present embodiment, the 0th-order data or 1st-order data of the image data a is supplied to the driver 54 at a time selected in view of the response delay, for thereby form a highly accurate image on the recording film F.

Figure 4:
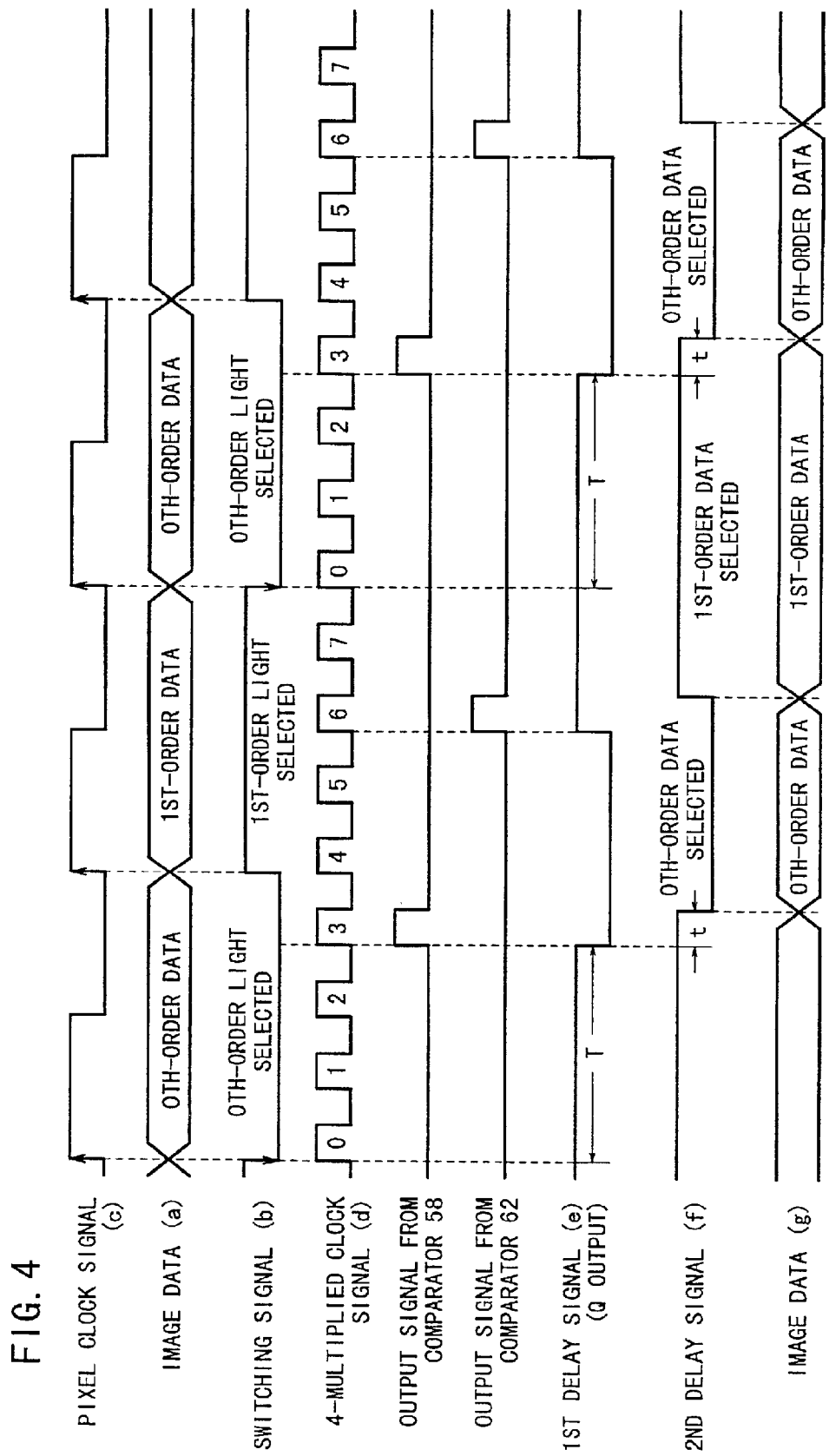
FIG. 4 is a timing chart of signals in the laser beam recording apparatus.

A process of generating the second delay signal f to supply the 0th-order data and 1st-order data of the image data a to the LD driver 54 in view of the response delay of the AOD 24 will be described in detail below with reference to FIGS. 3 and 4. FIG. 4 is a timing chart of signals for the multiplication number n=4, the delayed pulse number setting value k=3, the duty setting value r=n+k=7 when the switching signal generator 34 is repeatedly turned on and off for every four pulses of the 4-multiplied clock signal d.

The pixel clock signal c outputted from the PLL 32 is supplied to the n-multiplied clock signal generator 36, which generates the n-multiplied clock signal d by multiplying the pixel clock signal c by n (n is an integer of 2 or greater). The n-multiplied clock signal d is supplied to the counter 56 of the first delay unit 44, which counts pulses of the supplied n-multiplied clock signal d.

The counter 56 is reset by a negative-going edge of the switching signal b, for example, and thereafter starts counting pulses of the n-multiplied clock signal d. The comparator 58 compares the count K from the counter 56 with the delayed pulse number setting value k supplied from the register 46. The delayed pulse number setting value k is set as a count of the n-multiplied clock signal d which is capable of obtaining a delay time T for coarsely adjusting the response delay time of the AOD 24. When the count K is in conformity with the delayed pulse number setting value k, the comparator 58 outputs a high-level signal through the OR gate 64 to the clock terminal of the D-FF 66.

If k<n, i.e., if the delay time of switching operation to switch between the states of the AOD 24 is shorter than the time required to switch between the 0th-order light and the 1st-order light according to the switching signal b (see FIG. 4), then the signal inverter 67 supplies the switching signal b as it is to the D terminal of the D-FF 66. Therefore, the D-FF 66 outputs the first delay signal e, which is produced by delaying the switching signal b by the delayed pulse number setting value k (corresponding to the delay time T), from the Q terminal to the second delay unit 48.

If k≧n, e.g., if the delay time of switching operation to switch between the states of the AOD 24 is equal to or longer than the time required to switch between the 0th-order light and the 1st-order light according to the switching signal b, then the signal inverter 67 inverts the switching signal b and supplies the inverted switching signal b to the D terminal of the D-FF 66. When the switching signal b for selecting next 1st-order light, for example, is supplied to the AOD driver 40 in FIG. 4, the D-FF 66 outputs the first delay signal e for selecting preceding 0th-order data from the image output unit 38 from the Q terminal, and supplies the first delay signal e to the second delay unit 48, according to the inverted switching signal b.

Then, the delay element 68 of the second delay unit 48 generates a plurality of delay signals which are produced by delaying the first delay signal e supplied from the first delay unit 44 by respective different small delay times, and outputs the generated delay signals to the signal selector 70. The signal selector 70 is supplied with the small delay time selecting value m from the register 50. According to the supplied small delay time selecting value m, the signal selector 70 selects one of the delay signals from the delay element 68, which is capable of obtaining a desired small delay time t, and outputs the selected delay signal as the finely adjusted second delay signal f.

The second delay signal f thus generated is supplied to the image data output unit 38. The image data output unit 38 reads the 0th-order data or the 1st-order data selected by the switching signal b with a delay represented by a desired delay time (T+t) with respect to the switching signal b, according to the second delay signal f, and supplies the 0th-order data or the 1st-order data to the LD driver 54. The LD driver 54 outputs a desired laser beam L after elapse of the delay time (T+t) which allows the AOD 24 to output the 0th-order light of the 1st-order light reliably.

The comparator 62 of the first delay unit 44 is supplied with the count K from the counter 56 and the duty setting value r from the register 46. If k<n, then the duty setting value r is set according to the relationship: r =k+n+D, and if k≧n, then the duty setting value r is set according to the relationship: r=k−n+D where D represents the difference between the time required for the AOD 24 to be set to a state capable of outputting the 0th-order light and the time required for the AOD 24 to be set to a state capable of outputting the 1st-order light, as the count of the n-multiplied clock signal d. In FIG. 4, the count D is set to −1.

When the count K becomes equal to the duty setting value r, the comparator 62 outputs a high-level signal via the OR gate 64 to the clock terminal of the D-FF 66. Therefore, after the D-FF 66 has generated the first delay signal e based on the output signal from the comparator 58 and then counted (n+D) pulses, the D-FF 66 outputs the first delay signal e based on the switching signal b supplied via the signal inverter 67.

The first delay signal e thus generated is similarly supplied via the second delay unit 48 to the image data output unit 38, which controls the LD driver 54 to energize the laser diode LD to emit a desired laser beam L.

The above operation is repeated to switch the laser beam L depending on the operation delay characteristics including duty ratios for the 0th-order light and the 1st-order light of the AOD 24, so that an image based on the laser beam L0 can reliably be recorded at the main scanning line M0 on the recording film F and an image based on the laser beam L1 can reliably be recorded at the main scanning line M1 on the recording film F.

In the above embodiment, the delay time T is coarsely adjusted by the first delay unit 44, and the small delay time t is adjusted by the second delay unit 48. However, the response delay may be adjusted by only one of the first delay unit 44 and the second delay unit 48 depending on the delay time caused by the AOD 24.

While the second delay unit 48 is arranged to have the single delay element 68 generate a plurality of different delay signals in the above embodiment, the second delay unit 48 may comprise a plurality of delay elements having different delay times. Alternatively, the second delay unit 48 may comprise a delay element which is set to a delay time as a physical property or a programmable delay element.

A light beam deflecting means other than the AOD 24 may be used to deflect the light beam insofar as the light beam deflecting means has a response delay. According to the present invention, the response delay of the light beam deflecting means can be adjusted to record a highly accurate image on the image recording material.

In the above embodiment, the laser beam L is deflected a small distance in the auxiliary scanning direction by the AOD 24 with respect to the recording film F which rotates in the main scanning direction, for recording a plurality of main scanning lines M0, M1 on the recording film F. However, a plurality of main scanning lines M0, M1 may be recorded on the recording film F by deflecting the laser beam L a small distance in a direction which is different from either the main scanning direction or the auxiliary scanning direction.

Further, the image may be recorded on the image recording material for the exposure recording apparatus of the present invention by a light or heat energy of the light beam emitted from the light source. Specifically, a printing plate such as the recording film F, a photosensitive material like a photographic paper, a photopolymer press plate, a thermal press plate and a silver salt diffusion transcripting press plate may be used as the image recording material.

Although a certain preferred embodiment of the present invention has been shown and described in detail, it should be understood that various changes and modifications may be made therein without departing from the scope of the appended claims.

What is claimed is:

1. An exposure recording apparatus for recording a two-dimensional image on an image recording material by applying a light beam emitted from a light source to the image recording material to scan the image recording material relatively in a main scanning direction and in an auxiliary scanning direction, comprising:

light beam deflecting means disposed in a light path of said light beam, for deflecting said light beam a small distance in a direction different from said main scanning direction, based on a switching signal;

delay signal generating means for generating a delay signal delayed from said switching signal by a predetermined time, depending on the time required for said light beam deflecting means to deflect said light beam;

light beam modulating means for modulating said light beam with image information according to said delay signal; and wherein the light beam is deflected the small distance in the direction different from said main scanning direction to generate a plurality of main scanning lines on the image recording material to record a two-dimensional image thereon by exposure of the image recording material to the light beam.

2. An exposure recording apparatus according to claim 1, further comprising:

main scanning position detecting means for detecting the position in the main scanning direction of said light beam with respect to said image recording material; and switching signal generating means for generating said switching signal based on a main scanning position detecting signal from said scanning position detecting means.

3. An exposure recording apparatus according to claim 1, wherein said light beam deflecting means comprises an acousto-optic deflector.

4. An exposure recording apparatus according to claim 1, wherein said delay signal generating means comprises:

a measuring unit for measuring time after said switching signal is generated;

a first comparator for comparing the measured time with a predetermined delay setting time; and a delay-signal output unit for outputting said delay signal according to an output signal from said first comparator when the measured time and said predetermined delay setting time are in conformity with each other.

5. An exposure recording apparatus according to claim 4, wherein said delay signal generating means further comprises:

a second comparator for comparing a duty setting time relative to duty ratios of a plurality of deflected states of said light beam deflected by said light beam deflecting means, with said time measured by said measuring unit; and a delay signal switching unit for switching said delay signal according to an output signal from said second comparator when said duty setting time and said measured time are in conformity with each other.

6. An exposure recording apparatus according to claim 1, wherein said delay signal generating means comprises:

a first delay unit for coarsely adjusting said delay signal; and a second delay unit for finely adjusting the delay signal which has been coarsely adjusted by said first delay unit.

7. An exposure recording apparatus according to claim 6, wherein said delay signal generating means further comprises:

a first register for holding coarse adjustment data for coarsely adjusting said delay signal; and a second register for holding fine adjustment data for finely adjusting the delay signal which has been coarsely adjusted based on said coarse adjustment data.

8. An exposure recording apparatus according to claim 6, wherein said second delay unit comprises a delay element.

9. An exposure recording apparatus according to claim 1, wherein said direction in which said light beam is deflected by said light beam deflecting means comprises said auxiliary scanning direction.

10. An exposure recording apparatus according to claim 1, wherein said direction in which said light beam is deflected by said light beam deflecting means is different from either one of said main scanning direction and said auxiliary scanning direction.

11. An exposure recording apparatus according to claim 1, wherein the plurality of main scanning lines are generated alternately in time.

12. An exposure recording apparatus for recording a two-dimensional image on an image recording material by applying a light beam emitted from a light source to the image recording material to scan the image recording material relatively in a main scanning direction and in an auxiliary scanning direction, comprising:

a light beam deflector disposed in a light path of said light beam, which deflects said light beam a small distance in a direction different from said main scanning direction, based on a switching signal;

a delay signal generator which generates a delay signal delayed from said switching signal by a predetermined time, depending on the time required for said light beam deflector to deflect said light beam;

a light beam modulator which modulates said light beam with image information according to said delay signal; and wherein the light beam is deflected the small distance in the direction different from said main scanning direction to generate a plurality of main scanning lines on the image recording material to record a two-dimensional image thereon by exposure of the image recording material to the light beam.

13. An exposure recording apparatus according to claim 12, wherein said delay signal generator comprises:

a first delay unit for coarsely adjusting said delay signal; and a second delay unit for finely adjusting the delay signal which has been coarsely adjusted by said first delay unit.

14. An exposure recording apparatus according to claim 12, wherein the plurality of main scanning lines are generated alternately in time.

15. An exposure recording apparatus according to claim 12, wherein said delay signal generator comprises:
- a measuring unit for measuring time after said switching signal is generated;
- a first comparator for comparing the measured time with a predetermined delay setting time; and
- a delay-signal output unit for outputting said delay signal according to an output signal from said first comparator when the measured time and said predetermined delay setting time are in conformity with each other.

16. An exposure recording apparatus according to claim 15, wherein said delay signal generator further comprises:
- a second comparator for comparing a duty setting time relative to duty ratios of a plurality of deflected states of said light beam deflected by said light beam deflector, with said time measured by said measuring unit; and
- a delay signal switching unit for switching said delay signal according to an output signal from said second comparator when said duty setting time and said measured time are in conformity with each other.

* * * * *